Figure 1:
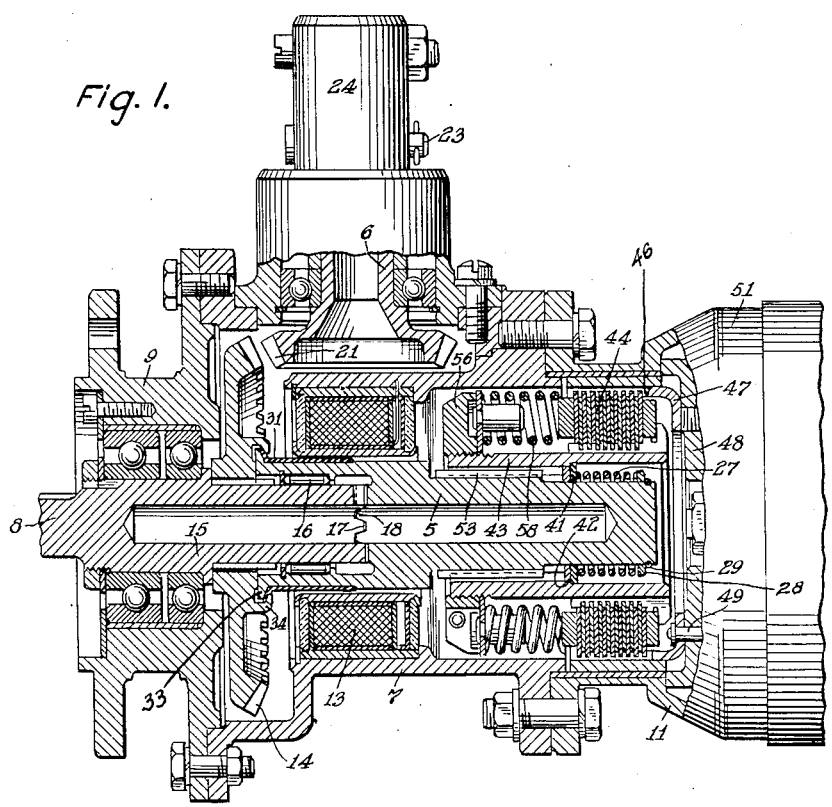

Dec. 14, 1943.  R. M. NARDONE  2,336,562

DRIVING MECHANISM

Filed Nov. 15, 1941

INVENTOR.
ROMEO M. NARDONE:
BY Martin J. Finnegan
ATTORNEY.

Patented Dec. 14, 1943

2,336,562

UNITED STATES PATENT OFFICE 2,336,562

DRIVING MECHANISM

Romeo M. Nardone, Westwood, N. J., assignor to Bendix Aviation Corporation, South Bend, Ind., a corporation of Delaware Application November 15, 1941, Serial No. 419,341

2 Claims. (Cl. 172—239)

This invention relates to driving mechanism, and particularly to driving mechanism of the type which includes a yieldable clutch means enabling the motor to overrun the driven element as soon as the latter reaches the limit of its travel. This is of special importance in the actuation of aircraft landing gear, the improvement of which constitutes a major object of the present invention.

One of the requirements in airplane installations is that the friction clutch must be capable of slipping for five minutes at its normal clutch setting without any increase in clutch value. This is claimed to be necessary in case the limit switches on the part moved, such as the landing gear, fail to function. In that case the motor will keep on operating and the clutch will slip until the pilot manually shuts off the motor. Since the airplane structure must be made as light in weight as it is possible to make it, any increase in clutch value brought about by the heat created in the plates would be dangerous to the structure. It is well known that the usual type of pre-set friction disc clutch has a marked tendency to rise in torque value when slipping for a number of seconds. There are, of course, special clutch mechanisms that will not rise in torque value but these would be complicated and heavy.

If the electric motor of the power unit could be automatically cut out after only one or two seconds of clutch slippage (in case the limit switch did not function) the five minute requirement would not be necessary, nor would any difficulty be experienced with rise in clutch torque. To provide such automatic cut-out action is an object of this invention.

Another object is to reduce installation weight. To this end, it is proposed to provide a reversible motor having only one set of field coils, and current reversing means including two small solenoids to actuate two sets of commutator brushes to engage one or the other set with the commutator, according to the desired direction of rotation. An appreciable weight saving will thereby result.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Figure 2:
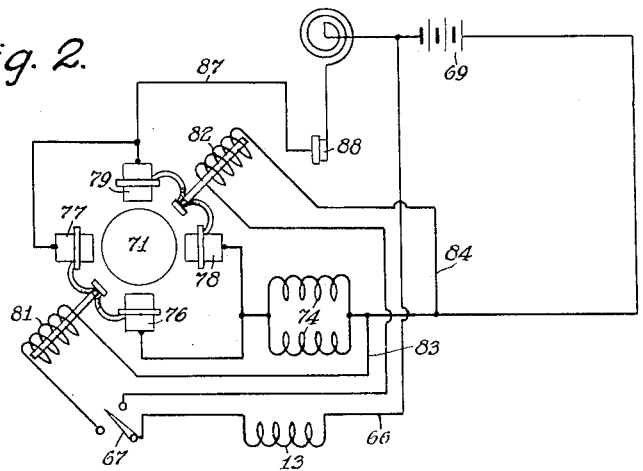

In the drawing,

Fig. 1 is a longitudinal sectional view of a device to which the invention may be applied, (the selected device corresponding to that of Allen Patent No. 2,184,032); and Fig. 2 is a schematic diagram of the preferred embodiment.

Reference characters 5 and 6 designate driving shafts mounted at right angles to one another in a common housing 7, either of the shafts being capable, under certain conditions, of actuating a driven shaft 8 also journalled in an extension 9 of the housing 7, a similar extension 11 being provided as a means of housing a motor or other actuating means for the shaft 5.

The elements involved in the choice of driving means for the driven shaft 8 (which may be the actuator of a landing gear such as that of the Minshall Patent No. 2,005,980 of June 25, 1935, or some other load to be driven) include a solenoid 13 and a bevel gear 14 herein shown as integral with the enlarged and centrally bored end 15 of the driven shaft 8 and so located with respect to the driving shafts 5 and 6 that it is capable of receiving rotation from either of said shafts depending upon whether it is in a left-hand position as shown in Fig. 1, or its right-hand position (not shown). In the former position the clutch teeth 17 which are formed upon the hollow end of the shaft 15 are fully engaged with the correspondingly shaped teeth 18 on the correspondingly bored end of the shaft 5, while in the latter position the teeth 17 and 18 are disengaged, but the teeth of bevel gear 14 are fully meshed with those of the correspondingly shaped bevel pinion 21 shown herein as an integral extension of the driving shaft 6, the outer end of which is provided with a pin 23 or other suitable means serving for attachment of a sleeve 24 or other manually operable instrumentality. A coil compression spring 27 constantly bears against a collar 28 held fast to the inner end of shaft 5 by suitable means 29 and thus constantly exerts a pressure on the shaft 5 tending to demesh the teeth 18 from the teeth 17 of the shaft 8. Spring 27 therefore opposes the pull of the solenoid 13 and the latter when energized acts upon the shaft 5 which constitutes a movable magnetizable core with respect to the winding 13, a sleeve 31 of non-magnetizable material being wrapped about that portion of the core 5 which is on the left of the center line of the coil 13 so that the effect of the magnetic flux resulting from energization of the coil 13 is to draw the shaft 5 to the left, the gear 14 moving with the said shaft 5 by reason of the interlocking projections 33 and 34 formed upon the shaft 5 and the gear 14, respectively. Upon deenergization of the solenoid 13 these interlocking projections are similarly effective to draw the gear 14 into mesh with the gear 21 in response to the thrust exerted by the expansion of the spring 27 from its fully compressed position, as shown in Fig. 1, to its extended position. The left-hand end of the spring 27 rests against collar or disc 41 which engages the shoulder 42 of the relatively stationary sleeve 43 constituting the inner race of a friction disc clutch 44 consisting of a plurality of interleaving friction plates splined alternately to the sleeve 43 and a second sleeve or shell 46 having an inwardly turned rim 47 secured to a driving member 48 by a suitable means such as that indicated at 49, the said driving means 48 being a part integral with or connecting to the armature of the electric motor indicated diagrammatically at 71 in Fig. 2. Transmission of torque from the clutch elements 46, 44, 43 to the shaft 5 is provided for in the form of splines 53 on the shaft 5 engaging corresponding splines on the inner surface of the sleeve 43, the outer surface thereof being threaded to receive a nut 56 which constitutes a means for adjusting the pressure of springs 58 and hence the torque transmitting capacity of the clutch 44.

The solenoid winding 13 is shown in Fig. 2 as connected in a circuit 66 leading from manual switch 67 to a battery 69 constituting the source of current for the electric motor 51. The motor commutator 71 (Fig. 2) is preferably provided with four brushes (76, 77, 78, 79) and the field windings 74 are in series therewith. A pair of solenoids 81 and 82 are provided, one of which acts upon brushes 76 and 77 to engage them with the commutator and thus cause clockwise rotation of the motor in one position of switch 67, and the other of which solenoids is energized to engage brushes 78 and 79 and thereby produce counterclockwise rotation of the motor in the opposite position of the switch 67, said solenoids being connected with the source 69, as indicated at 83 and 84; and the brush operating structure being preferably like that shown in Figs. 5 and 6 of my application No. 387,540, filed April 8, 1941.

The novel automatic motor deenergizing (cutout) means will now be described:

In the line between battery and motor, as illustrated at 87, there is included a thermostatic, snap-action switch 88 which remains closed under normal operation of the unit but which will over-heat under slipping clutch torque load and therefore snap open. The slipping clutch 44 is usually set about 50% higher than the normal torque required during operation. Therefore, under normal conditions the current flow through the thermo-switch will be fairly low. When the clutch 44 slips, the motor will draw an appreciably higher current, and this increased current flow occurs through the switch. It requires only a few seconds of this increased current flow to produce a sufficient heat rise to cause the switch 88 to snap to the open position. The motor then stops.

After such automatic breaking of the motor circuit, the operator may open switch 67 manually; but if the operator fails to open this manual switch 67, the subsequent automatic reclosing of the thermo-switch (upon cooling) will start the motor again. The cycle of opening and closing may, in fact, recur several times, but suitable adjustments to the thermo-switch may be made so as to delay the reclosing for a considerable length of time.

What is claimed is:

1. Motor control means comprising, in combination with the main motor winding, energizing means including a source of current and a circuit from said source to said main winding, said circuit including normally disengaged commutator brushes and a normally closed switch, means responsive to development of a predetermined current value in said main winding to open said normally closed switch, whether the motor temperature be high or low when said predetermined current value is reached, a pair of brush-engaging solenoids in parallel circuit relationship to said main winding, and means for selectively energizing said solenoids, to cause current flow through said main winding, and hence the rotation of said motor, in one direction or the other, according to which solenoid is energized, said means further operating to continue such rotation until operation of said switch-opening means.

2. Motor control means comprising, in combination with the main motor winding, energizing means including a source of current and a circuit from said source to said main winding, said circuit including normally disengaged commutator brushes and a normally closed switch, means responsive to development of a predetermined current value in said main winding to open said normally closed switch, a brush-engaging solenoid in parallel circuit relationship to said main winding, and means for energizing said solenoid, to cause current flow through said main winding, and hence the rotation of said motor, said means further operating to continue such rotation until operation of said switch-opening means.

ROMEO M. NARDONE.